(12) United States Patent
Meller et al.

(10) Patent No.: US 12,339,041 B2
(45) Date of Patent: Jun. 24, 2025

(54) AUTONOMOUS ROBOT FOR TRANSFERRING A SOLAR PANEL AND SOLAR TRACKER CLEANING ROBOT

(71) Applicant: Ecoppia Scientific Ltd., Herzliya (IL)

(72) Inventors: Moshe Meller, Tortola (VG); Eran Dgani, Tortola (VG)

(73) Assignee: Ecoppia Scientific Ltd., Herzliya (IL)

( * ) Notice: Subject to any disclaimer, the term of this patent is extended or adjusted under 35 U.S.C. 154(b) by 263 days.

(21) Appl. No.: 17/925,122

(22) PCT Filed: May 13, 2021

(86) PCT No.: PCT/IB2021/054119
§ 371 (c)(1),
(2) Date: Nov. 14, 2022

(87) PCT Pub. No.: WO2021/229505
PCT Pub. Date: Nov. 18, 2021

(65) Prior Publication Data
US 2023/0175739 A1  Jun. 8, 2023

Related U.S. Application Data

(60) Provisional application No. 63/187,471, filed on May 12, 2021, provisional application No. 63/154,736, (Continued)

(51) Int. Cl.
*F24S 40/20* (2018.01)
*B25J 5/00* (2006.01)
(Continued)

(52) U.S. Cl.
CPC .............. *F24S 40/20* (2018.05); *B25J 5/007* (2013.01); *B25J 9/0009* (2013.01); *B25J 11/0085* (2013.01)

(58) Field of Classification Search
CPC .......... F24S 40/20; H02S 40/10; H02S 40/12; A47L 11/10; A47L 11/14; A47L 11/18;
(Continued)

(56) References Cited

U.S. PATENT DOCUMENTS

2011/0137458 A1  6/2011  Hisatani et al.

FOREIGN PATENT DOCUMENTS

| CN | 205797826 U | * 12/2016 |
| EP | 2559956 A1 | 2/2013 |
| WO | 2019053743 A1 | 3/2019 |

OTHER PUBLICATIONS

Machine Translation of Han et al., CN-205797826-U, Dec. 2016. (Year: 2016).*

(Continued)

*Primary Examiner* — David G Cormier
(74) *Attorney, Agent, or Firm* — Brown Rudnick LLP; Matthew P. York

(57) ABSTRACT

Autonomous robot for transporting a robotic cleaner for cleaning at least one solar table of at least one solar row, including a platform, a plurality of wheels, at least one drive motor, a plurality of pistons, an upper rail and a lower rail, at least two tilt sensors, at least one rechargeable power source, at least one proximity sensor, a stop sensor, at least two positioning sensors, a processor and a wireless communicator, the upper and lower rails each being respectively coupled with at least two of the pistons, a first tilt sensor coupled with the upper rail and a second tilt sensor coupled with the lower rail, wherein the pistons can respectively raise and lower the upper and lower rails, each one of the pistons can be independently raised and lowered and the robotic cleaner can communicate wirelessly with the autonomous robot and coordinate cleaning of the solar table.

10 Claims, 8 Drawing Sheets

Related U.S. Application Data filed on Feb. 28, 2021, provisional application No. 63/024,687, filed on May 14, 2020.

(51) Int. Cl.
*B25J 9/00* (2006.01)
*B25J 11/00* (2006.01)

(58) Field of Classification Search
CPC ........ A47L 11/185; A47L 11/19; A47L 11/38; A47L 11/4041; A47L 11/4063; A47L 11/4066; A47L 11/4069; A47L 11/4072
See application file for complete search history.

(56) References Cited

OTHER PUBLICATIONS

International Search Report mailed Sep. 20, 2021, for International Application No. PCT/IB2021/054119, filed May 13, 2021 (3 pages).
Written Opinion mailed Sep. 20, 2021, for International Application No. PCT/IB2021/054119, filed May 13, 2021 (10 pages).

\* cited by examiner

AUTONOMOUS ROBOT FOR TRANSFERRING A SOLAR PANEL AND SOLAR TRACKER CLEANING ROBOT

CROSS-REFERENCE TO RELATED APPLICATIONS

The present application is a national stage entry of PCT/IB2021/054119 with an International Filing Date of May 13, 2021, which claims the benefit of, and priority to, U.S. Provisional Application Nos.: 63/024,687, filed May 14, 2020; 63/154,736, filed Feb. 28, 2021; and 63/187,471, filed May 12, 2021, the contents of each of which are incorporated by reference herein their entirety.

FIELD OF THE DISCLOSED TECHNIQUE

The disclosed technique relates to autonomous robots, in general, and to methods and systems for autonomous robots for use in solar panel and solar tracker cleaning systems, in particular.

BACKGROUND OF THE DISCLOSED TECHNIQUE

The challenges of global climate change and energy circuitry demands have made the development of renewable energy alternatives vital for the future of mankind. The use of direct sun radiation on solar panels can potentially produce more than enough energy to meet the energy needs of the entire planet. As the price of solar power decreases and the pollution caused by conventional fuels rises, the solar business has entered a new era of worldwide growth.

In order to bring technologies to exploit solar energy one step closer to be on par with conventional fuels, the efficiency rate of solar systems must improve. Solar panel efficiency depends amongst other things on the cleanliness of their surface. Energy losses caused by dust and soiling can reach over 40%. In desert areas, where many solar parks are located, the soiling and dust problem is significant.

A fast growing type of solar park is the solar tracker park. The solar trackers have the ability to follow the sun's position continuously from morning to evening by changing their tilt angle from east (in the morning) to west (in the evening) in order to increase efficiency. Automatic cleaning solutions for solar trackers usually involve high volumes of water and/or the installation of special grids in the solar tracker park for moving automatic cleaners from solar tracker to solar tracker. Such solutions are not cost effective and require added labor for installation.

Robots for cleaning solar panel surfaces in solar parks are known in the art. Solar parks typically have rows upon rows of solar tables or solar trackers and one challenge for cleaning such solar parks with robotic cleaners is moving such robots from solar row to solar row. One solution includes installing a robotic cleaner per solar row, thus obviating the need to move the robotic cleaner from row to row. However such a solution is costly since many robotic cleaners need to be purchased to clean an entire solar park, and each robotic cleaner requires its own maintenance, including replacing worn out parts. Another solution involves manually moving the robotic cleaner from solar row to solar row, thus obviating the need to purchase multiple robotic cleaners to clean an entire solar park. However such a solution requires manual labor to physically move and mount the robotic cleaner from solar row to solar row. A further solution, such as presented in U.S. Pat. No. 8,771,432 B2 to Meller et al., entitled "Solar Panel Cleaning System and Method" includes a frame system mounted on wheels which can transport a robotic cleaning system from solar row to solar row. Such a system however requires a special installation on the grounds of the solar park including rails which enable the frame system to move from solar row to solar row accurately. An addition solution involves the installation of a specially designed track between solar rows for transporting the robotic cleaning system from solar row to solar row. Whereas such a system enables a single robotic cleaning system to clean a plurality of solar rows, the terrain between the solar rows needs to be flattened and prepared so the specially designed track can be installed. This solution might be costly in cases where the solar park is installed in mountainous terrain and/or rocky terrain.

What is needed is a system for moving a robotic cleaner from solar row to solar row which does not require any special ground installation, is cost effective and easily deployable.

SUMMARY OF THE DISCLOSED TECHNIQUE

The disclosed technique overcomes the disadvantages of the prior art by providing a novel and inventive autonomous robot for transporting a robotic cleaner from solar row to solar row. According to one aspect of the disclosed technique there is thus provided an autonomous robot for transporting a robotic cleaner for cleaning at least one solar table of at least one solar row. The autonomous robot includes a platform, a plurality of wheels, at least one drive motor, a plurality of pistons, an upper rail and a lower rail, at least two tilt sensors, at least one rechargeable power source, at least one proximity sensor, a stop sensor, at least two positioning sensors, a processor and a wireless communicator. The wheels are coupled with the platform and are for driving the platform. The drive motor is coupled with the wheels and is for driving the wheels. The upper rail and lower rail are each respectively coupled with at least two of the pistons. A first one of the tilt sensors is coupled with the upper rail and a second one of the tilt sensors is coupled with the lower rail. The rechargeable power source is positioned on the platform. The proximity sensor and the stop sensor are each coupled with the platform. The processor is coupled with the drive motor, the pistons, the tilt sensors, the rechargeable power source, the proximity sensor, the stop sensor and the positioning sensors. The wireless communicator is coupled with the processor and with the rechargeable power source. The pistons can respectively raise and lower at least one of the upper rail and the lower rail and each one of the pistons can be independently raised and lowered. The proximity sensor is for maintaining the autonomous robot aligned with the solar row and the stop sensor is for horizontally aligning the autonomous robot with the solar table. The positioning sensors are for vertically aligning the upper rail and the lower rail with the solar table and the robotic cleaner can communicate wirelessly with the autonomous robot and coordinate cleaning of the solar table.

According to another aspect of the disclosed technique there is thus provided an autonomous robot for transporting a robotic cleaner for cleaning at least one solar table of at least one solar row. The autonomous robot includes a main body, a plurality of wheels, at least one drive motor, an extension section, a vertical arm, an extending arm, a connector, at least one proximity sensor, a stop sensor, at least one rechargeable power source, a processor and a wireless communicator. The wheels are coupled with the main body and are for driving the main body. The drive motor is coupled with the wheels and is for driving the wheels. The extension section is coupled with the main body, the vertical arm is coupled with the extension section and the extending arm is coupled with the vertical arm. The connector is coupled with the extending arm and can attach to and detach from the robotic cleaner. The proximity sensor and the stop sensor are coupled with the main body. The rechargeable power source is positioned on the main body. The processor is coupled with the drive motor, the connector, the rechargeable power source, the stop sensor and the proximity sensor. The wireless communicator is coupled with the processor and with the rechargeable power source. The proximity sensor is for maintaining the autonomous robot aligned with the solar row and the stop sensor is for horizontally aligning the autonomous robot with the solar table. The robotic cleaner can communicate wirelessly with the autonomous robot and coordinate cleaning of the solar table. The vertical arm and the extending arm can move the robotic cleaner back and forth from the main body to the solar table.

According to a further aspect of the disclosed technique there is thus provided an autonomous robot for transporting a robotic cleaner for cleaning at least one solar table of at least one solar row. The autonomous robot includes a main body, a plurality of wheels, at least one drive motor, a platform, a vertical lift mechanism, an extension portion, at least one rechargeable power source, at least one proximity sensor, a processor, a wireless communicator and at least one encoder. The wheels are coupled with the main body and are for driving the main body. The drive motor is coupled with the wheels and is for driving the wheels. The vertical lift mechanism is coupled with the main body and the platform and is for changing a height of the platform. The extension portion is coupled with the platform and is capable of horizontal movement relative to the platform. The rechargeable power source is positioned in the main body. The proximity sensor is coupled with the main body. The processor is coupled with the drive motor, the vertical lift mechanism, the extension portion, the rechargeable power source and the proximity sensor. The wireless communicator is coupled with the processor and with the rechargeable power source. The encoder is coupled with the processor and is for determining at least one of a position and an orientation of at least one of the platform and the extension portion in relation to the solar table. The proximity sensor is for maintaining the autonomous robot aligned with the solar row and the robotic cleaner can communicate wirelessly with the autonomous robot and coordinate cleaning of the solar table.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
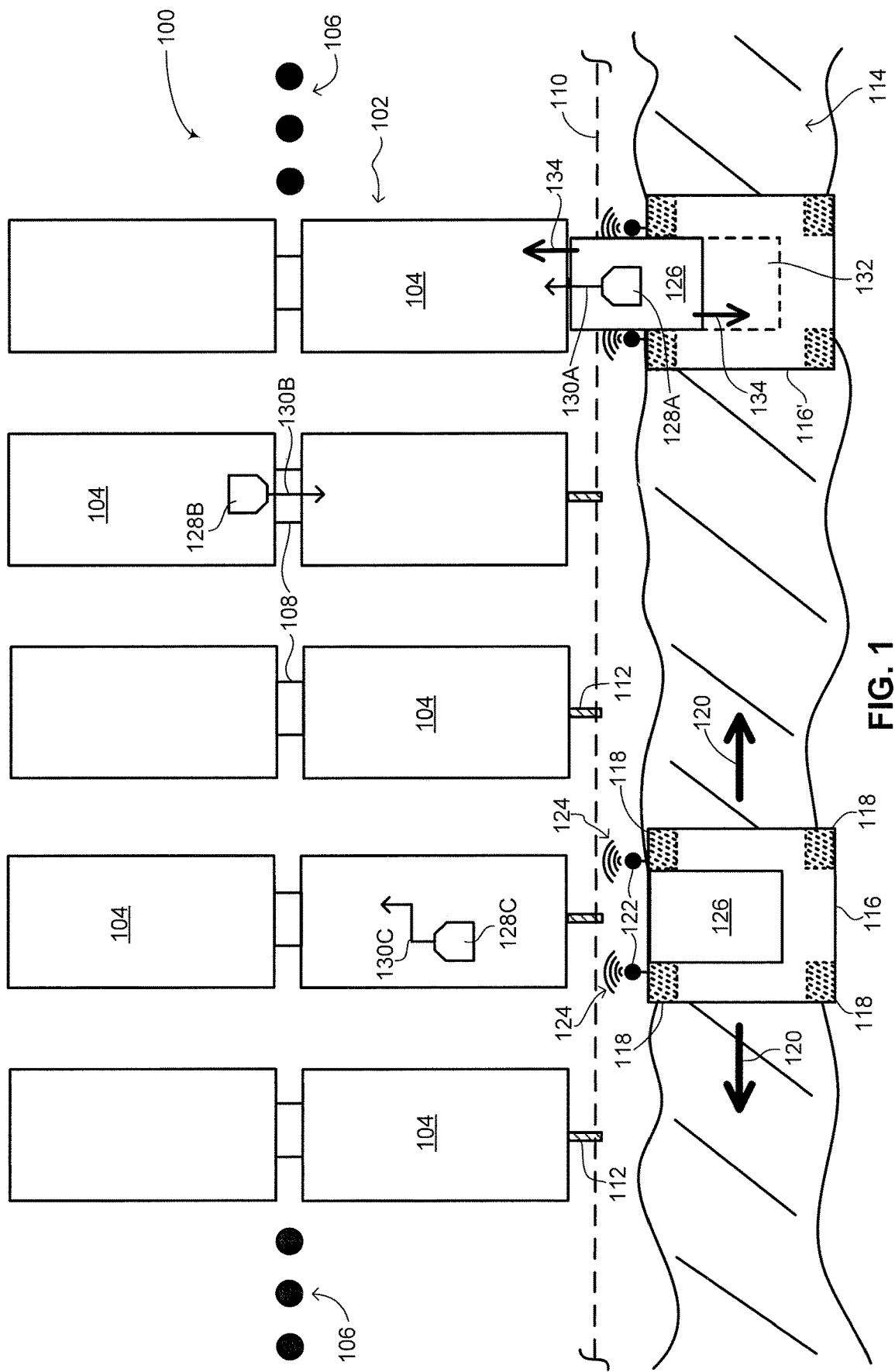
FIG. 1 is a schematic top view drawing of an autonomous robot for transferring a solar tracker cleaning robot from solar row to solar row, constructed and operative in accordance with an embodiment of the disclosed technique.

The disclosed technique overcomes the disadvantages of the prior art by providing a method and system for transferring a cleaning robot from one solar row to another solar row without requiring any special ground installation in the solar park. The disclosed technique includes an autonomous robot equipped with proximity sensors which can be used to navigate and guide the autonomous robot from solar row to solar row. The autonomous robot includes a main body as well as an extension portion. The extension portion can change its vertical position, its horizontal position as well as its angle in order to line its position and orientation with the position and orientation of a solar row. A robotic cleaner can be transported on the surface of the extension. Once properly positioned at a solar row, the robotic cleaner can exit the extension portion and move onto the solar row to clean it. The autonomous robot can wirelessly communicate and coordinate cleaning of the solar row with the robotic cleaner, thereby obviating the need for any manual labor in moving the autonomous robot from solar row to solar row and obviating the need for any manual labor in transferring the robotic cleaner from the autonomous robot onto the surface of the solar row. The autonomous robot can also act as a docking and charging station for the robotic cleaner and can also navigate itself back to its own docking station when it needs to recharge.

According to another embodiment, the disclosed technique includes an autonomous robot equipped with proximity sensors which can be used to navigate and guide the autonomous robot from solar row to solar row. The autonomous robot is equipped with a plurality of pistons upon which are mounted at least two rails for holding and transporting a cleaning robot. The plurality of pistons can be used to adjust the angle of the rails and thus the angle of the cleaning robot to match the angle of a solar tracker row. The autonomous robot is also equipped with a level sensor for determining the angle of the rails, thus regardless of the terrain, the rails can be angled to match the angle of the solar tracker row. In addition, the autonomous robot includes a large rechargeable power source, such as a large battery, which can be used to recharge a rechargeable power source on the cleaning robot when the cleaning robot is transported from solar tracker row to solar tracker row. Thus the rechargeable power source of the cleaning robot can be minimized, making the cleaning robot more lightweight and thus more energy efficient. A lighter weight cleaning robot also makes the cleaning robot less susceptible to damaging the surface of the solar panels. For example, heavier cleaning robots can cause microcracks on the surface of the solar panels and excessive weight can also cause damage to coatings placed on the solar panel surface. According to the disclosed technique, a lighter weight cleaning robot can be used which reduces the chances of microcracks forming on the solar panel surface due to the weight of the cleaning robot. A lighter cleaning robot also reduces the chances of damage being done to any coatings covering the solar panel surface because of the cleaning robot, such as an anti-reflective coating covering the solar panel surface.

According to a further embodiment, the disclosed technique includes an autonomous robot which includes a main body as well as an extension section with an extending arm. The main body can transport a cleaning robot on its upper surface. Similar to the embodiments described above, the autonomous robot is equipped with proximity sensors which can be used to navigate and guide the autonomous robot from solar row to solar row. Once properly positioned at a solar row, the extending arm can be used to position the robotic cleaner from the main body onto the solar row to clean it. Once finished, the robotic cleaner can be moved back from the solar row back onto the main body using the extending arm and the autonomous robot can then be navigated to the next solar row for cleaning.

It is noted that the term "solar tracker" is used throughout the description to describe the disclosed technique however the disclosed technique is not limited to solar trackers. The robotic cleaners and autonomous robots for transporting the robotic cleaners from solar row to solar row as described herein can be used with both solar trackers as well as stationary, fixed-angle solar panels.

Reference is now made to FIG. 1, which is a schematic top view drawing of an autonomous robot for transferring a solar tracker cleaning robot from solar row to solar row, generally referenced 100, constructed and operative in accordance with an embodiment of the disclosed technique. FIG. 1 shows a portion of a solar park (not referenced) with the autonomous robot of the disclosed technique being deployed. FIG. 1 shows a plurality of solar rows 102, each solar row including a plurality of solar tables 104, each solar table including a plurality of solar panels (not specifically shown). Ellipses 106 show that the solar park can include more solar rows on either side. In addition, each one of solar tables 104 can be connected to an adjacent solar table via a bridge 108. Even though each one of solar rows 102 is shown having two solar tables 104 and one bridge 108, this is merely brought as an example, and each solar row may include three or even more solar tables and a plurality of bridges for connecting adjacent solar tables to one another.

Through the description the term "solar table" is used to refer to a plurality of solar panels which are coupled and mounted into a single structure, as shown in FIG. 1. A solar table can either be fixed at a particular angle or it can change its angle to match the changing position of the sun in the sky. Fixed angle solar tables are referred to as such whereas variable angle solar tables are referred to as solar trackers. Regardless, the term "solar table" used herein refers to both types of solar tables and the disclosed technique can be used in both types of solar tables (fixed angle and/or variable angle).

The only installation required for the disclosed technique is a guiding cable 110, which can be coupled with each one of plurality of solar rows 102 via a respective mount 112. Guiding cable 110 is thus mounted from solar row to solar row but does not require any special ground installation. Guiding cable 110 can be made from any kind of durable metal which can withstand inclement weather such as rain, snow, ice, sand storms, extreme heat and the like. For example, guiding cable 110 can be made from stainless steel or aluminum. In another embodiment of the disclosed technique, guiding cable 110 can be simply positioned on the ground adjacent to solar rows 102 such that no respective mounts (such as mount 112) are needed. In a further embodiment of the disclosed technique, guiding cable 110 may be buried in the ground adjacent to solar rows 102. In such an embodiment, a narrow channel may be dug up to approximately 50-100 mm deep adjacent to solar rows 102 and guiding cable 110 may be placed in a conduit or pipe within the narrow channel which is then buried and covered by dirt. It is noted as well that guiding cable 110 may be frequency specific, such as used in guidance wire technology for keeping pets within an invisible boundary, guiding robotic lawn mowers and the like. In this respect, guiding cable 110 may emit low energy in a specific frequency range for defining the path via which the autonomous robot is to travel. The specific frequency range may be between 1-2 kilohertz, as an example, however other frequency ranges are possible. Guiding cable 110 may either actively emit (such as in the case of a transmitting antenna) and/or passively reflect specific frequencies for guiding the autonomous robot.

Shown in FIG. 1 is a dirt path 114 which is proximate to plurality of solar rows 102. The solar park of FIG. 1 may include many dirt paths alongside different pluralities of solar rows in the solar park. The disclosed technique includes an autonomous robot 116 which can travel down dirt path 114 from solar row to solar row. Autonomous robot 116 includes a plurality of wheels 118 as well as an extension portion 126. Autonomous robot 116 is shown in greater detail below in FIG. 2. Plurality of wheels 118 enable autonomous robot 116 to navigate and drive around the solar park. Plurality of wheels 118 are shown as four separate wheels in FIG. 1, however they may be embodied as two continuous tracks (such as a tank tread or a caterpillar track), as four completely independent wheels or each two sets of wheels coupled with at least one axle. Plurality of wheels 118 may also only include three wheels. Autonomous robot 116 includes at least one motor to drive plurality of wheels 118. As shown by plurality of arrows 120, plurality of wheels 118 can drive autonomous robot 116 along dirt path 114 from solar row to solar row.

Autonomous robot 116 also includes at least one proximity sensor 122 for sensing proximity to guiding cable 110. Each proximity sensor 122 emits a wireless signal 124 for detecting a target within its defined range. For example, proximity sensor 122 may have a defined range of 10 mm, 20 mm, 10 cm, 1 meter or even more. The target may be the particular metal guiding cable 110 is made from. The target may also be reflections of the emitted wireless signal at specific frequencies. Feedback from proximity sensor 122 to a processor (not shown) in autonomous robot 116 enables autonomous robot 116 to adjust its position via plurality of wheels 118 to remain within a defined distance from each one of solar rows 102. At least one proximity sensor 122 along with guiding cable 110 enables autonomous robot 116 to known its position vis-à-vis each one of solar rows 102 and thus travel in a generally straight direction from solar row to solar row. As mentioned above, guiding cable 110 may also be frequency specific and may actively emit low energy in a specific frequency range for guiding autonomous robot 116 from one solar row to another solar row. In such an embodiment, the proximity sensors may be passive sensors for detecting the low energy emitted by guiding cable 110 within a specific frequency range and thus would not emit a wireless signal. As mentioned above as well, guiding cable 110, whether passive (wherein proximity sensors 122 emit a wireless signal) or active (wherein guiding cable 110 emits a signal within a specific frequency range) may be mounted on mounts 112, placed directly on the ground or buried a few centimeters in the ground. As an active element, guiding cable 110 can generate an electromagnetic field within a specific frequency range which at least one proximity sensor 122 on autonomous robot 116 can detect.

Figure 2:
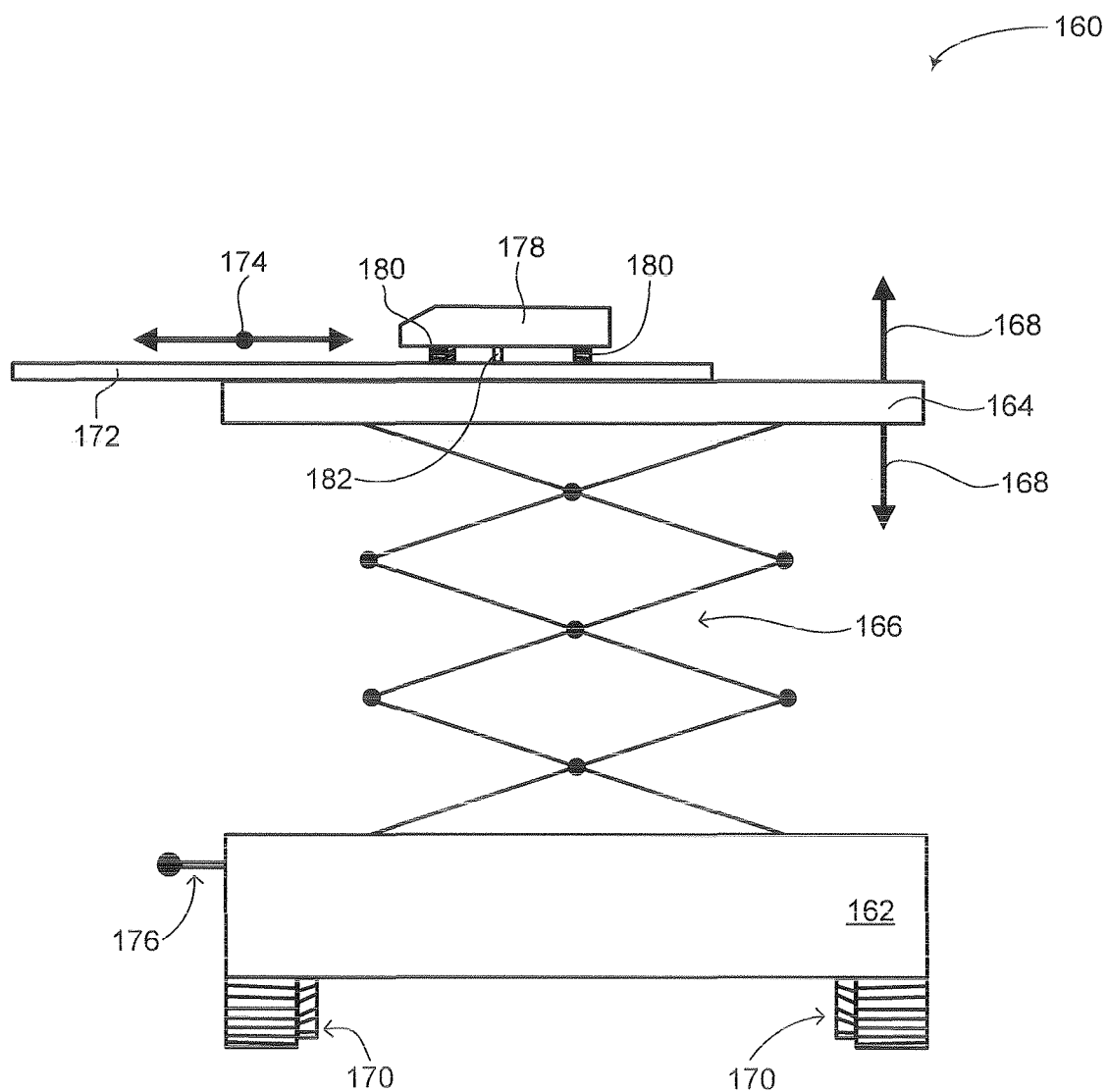
FIG. 2 is a schematic side view drawing of the autonomous robot of FIG. 1, constructed and operative in accordance with another embodiment of the disclosed technique.

Autonomous robot 116 also includes an extension portion 126 positioned on the upper body of autonomous robot 116 (shown in greater detail in FIG. 2). Extension portion 126 can be raised and lowered (i.e., its vertical position and thus height can be changed) and can also be extended and retracted (i.e., its horizontal position can be changed). Extension portion 126 can also optionally change its horizontal angle (i.e., its tilt angle can be changed, not shown) to match the horizontal angle of solar table 104. As shown by a plurality of arrows 134 in autonomous robot 116', extension portion 126 can extend towards and retract from a solar table most proximate to dirt path 114. Extension portion 126 is positioned on a platform 132 which may include at least one motor (not shown) for extending and retracting extension portion 126. Extension portion 126 is large enough to carry a robotic cleaner, such as robotic cleaner 128A. Once extension portion 126 has extended towards solar table 104, robotic cleaner 128A can then be deployed onto solar table 104 to clean, as shown by an arrow 130A. Robotic cleaner 128A can be any robotic cleaner which can navigate autonomously on a solar table surface. The robotic cleaner may clean with water and/or a liquid or may be a waterless robotic cleaner that cleans without any liquid. Robotic cleaner 128A also includes a wireless communicator for communicating with autonomous robot 116'. As shown in FIG. 1, robotic cleaner 128B has finished cleaning a solar table and is moving over bridge 108, as shown by an arrow 130B, to either clean another solar table or to return to the autonomous robot for transportation to another solar row and robotic cleaner 128C is just beginning to clean a solar table using its cleaning pattern, as shown by an arrow 130C. According to the disclosed technique, autonomous robot 116 and the robotic cleaner can communicate wirelessly regarding their position and their current state of action. For example, robotic cleaner 128A communicates to autonomous robot 116' that it is now exiting extension portion 126 onto solar table 104 and thus extension portion 126 should remain extended. Robotic cleaner 128C which has already begun cleaning a solar table can communicate to autonomous robot 116 that it can retract extension portion 126 and should wait in its position until robotic cleaner 128C has cleaned all the solar tables of the solar row it is cleaning. Robotic cleaner 128C can then communicate to autonomous robot 116 that it should again extend extension portion 126 to the solar table so robotic cleaner 128C can drive onto extension portion 126 and be transported to another solar row.

Extension portion 126 may be made from a ferromagnetic material or may have a portion (not shown) which is made from a ferromagnetic material. Robotic cleaner 128A may include a magnetic arm (not shown) for anchoring the robotic cleaner to extension portion 126, for example as autonomous robot 116' moves from solar row to solar row or if inclement weather is detected in the vicinity of the solar park. Extension portion 126 may further be coupled with a power source (not shown) in the main body (not referenced) of autonomous robot 116 such that robotic cleaner 128A can be electrically coupled with the power source. Robotic cleaner 128A includes a rechargeable battery (not shown). When robotic cleaner 128A is electrically coupled with the power source, the rechargeable battery of robotic cleaner 128A may thus be charged. Robotic cleaner 128A can be electrically coupled with extension portion 126 via a wireless connection, such that the rechargeable battery can be recharged inductively. Robotic cleaner 128A can be also electrically coupled with extension portion 126 via a physical connection, such as if robotic cleaner 128A includes a magnetic arm for physically coupling robotic cleaner 128A with extension portion 126. The physical coupling can be used to transfer charge via the magnetic arm to the rechargeable battery of robotic cleaner 128A.

Reference is now made to FIG. 2, which is a schematic side view drawing of the autonomous robot of FIG. 1, generally referenced 160, constructed and operative in accordance with another embodiment of the disclosed technique. As shown, autonomous robot 160 includes a main body 162, a platform 164 and an extension portion 172, as well as a plurality of wheels 170, respectively similar to autonomous robot 116, platform 132, extension portion 126 and plurality of wheels 118 (all FIG. 1). Autonomous robot 160 also includes at least one proximity sensor 176, similar to proximity sensor 122 (FIG. 1). As shown, proximity sensor 176 extends from a side of main body 162 and thus acts as a navigation guide, along with a guiding cable (not shown), to keep main body 162 at a predetermined distance from each solar row (not shown).

Main body 162 includes at least one motor (not shown) to drive plurality of wheels 170. Main body 162 can also include a power source (not shown), a processor (not shown) as well as a wireless communicator (not shown) having transmission and reception capabilities. The power source is used to drive plurality of wheels 170 as well as being a source of power to charge the rechargeable battery or power source of the robotic cleaner. A scissor mechanism 166 couples main body 162 with platform 164, enabling platform 164 to change its vertical position, as shown by a plurality of arrows 168. Scissor mechanism 166 may be embodied as any type of vertical lift mechanism. Extension portion 172 is coupled with platform 164, which might include at least one motor (not shown) for extending and retracting extension portion 172, as shown by a plurality of arrows 174. Platform 164 and extension portion 172 may be electrically coupled with main body 162 via scissor mechanism 166 such that charge from the power source in main body 162 can be transferred to platform 164 and extension portion 172 or to a designated portion of platform 164 and extension portion 172. Extension portion 172 may be made from a ferromagnetic material or may have a portion which is made from a ferromagnetic material.

As shown, a robotic cleaner 178 is positioned on extension portion 172. Robotic cleaner 178 includes a plurality of wheels 180 and may also include a magnetic arm 182 for magnetically anchoring robotic cleaner 178 to extension portion 172. Robotic cleaner 178 also includes, as mentioned above, a rechargeable power source (not shown) as well as a wireless communicator (not shown). As mentioned above in FIG. 1, the magnetic coupling may also enable charge to be provided to the rechargeable power source of robotic cleaner 178.

Platform 164 may include at least one motor (not shown) for extending and retracting extension portion 172. Platform 164 may also include at least one motor (not shown) for changing its tilt angle and thus the tilt angle of extension portion 172. Both main body 162 and platform 164 may include encoders (such as position encoders, not shown) for determining the position and/or orientation of platform 162 and extension portion 172 vis-à-vis a solar table. The encoders can determine the extension of scissor mechanism 166 thus determining the height of platform 164. The encoders can also determine the extension of extension portion 172 thus determining the horizontal position of extension portion 172. Using proximity sensor 176 and knowing the height and angle of a solar table, autonomous robot 160 can be brought to a position adjacent and proximate to the solar table. Scissor mechanism 166 can be extended such that platform 164 is substantially at the height of a solar table and then extension portion 172 can be extended such that it substantially touches or nearly touches the outer frame (not shown) of the solar table. Robotic cleaner 178 can then disengage its magnetic coupling (or other parking mechanism or docking mechanism) and drive onto the solar table to clean it.

As mentioned above, platform 164 can also adjust its tilt angle if necessary to match the tilt angle of the solar table. For example, if the solar table is a fixed angle solar table then platform 164 adjusts its tilt angle to be substantially at the fixed angle of the solar table. If the solar table is a solar tracker, then the solar tracker may be brought to a predetermined cleaning angle (such as, for example 0 degrees with respect to the horizon) before cleaning begins and platform 164 adjusts its tilt angle to be substantially at the predetermined cleaning angle of the solar tracker.

Autonomous robot 160 can thus transport robotic cleaner 178 from solar row to solar row to clean each solar row. Once cleaning of the solar rows is complete, autonomous robot 160 can navigate back to a charging station (not shown) located far enough away from any solar row in the solar park so as not to create shadows on the solar rows. The charging station may be coupled with the guiding cable (not shown) so autonomous robot 160 can easily navigate back towards the charging station. The charging station may also not be coupled with the guiding cable and main body 162 may be equipped with a GPS (not shown) for navigating autonomous robot 160 back to the charging station.

With reference back to FIG. 1, the communication and coordination between autonomous robot 116' and robotic cleaner 128A can occur as follows. Autonomous robot 116' using proximity sensor 122 determines that it is positioned correctly in front of a given solar row. The processor of autonomous robot 116' then provides a command to platform 132 to raise itself using the vertical lift mechanism (not shown in FIG. 1) to the height of solar table 104. The processor of autonomous robot 116' can communicate with a central processor (not shown) of the solar park to determine the tilt angle of solar table 104 and to adjust the tilt angle of platform 132 to the tilt angle of solar table 104. Alternatively, when autonomous robot 116' is deployed to transport robotic cleaner 128A to clean solar rows 102, the central processor may provide a command to all solar rows in the solar park to adjust and tilt to a predetermined cleaning angle (for example in the case of solar trackers) such that when platform 132 is raised to the height of solar table 104, the processor provides a command to tilt (if necessary) platform 132 to substantially match the predetermined cleaning angle. The processor then provides a command to extend extension portion 126. The amount extended by extension portion 126 may be predetermined based on the positioning of guiding cable 110. Extension portion 126 may also be equipped with at least one proximity sensor (not shown) to determine when it is sufficiently close to the outer frame (not referenced) of solar table 104. The processor of autonomous robot 116' then provides a disengage command to robotic cleaner 128A to disengage its magnetic arm (or parking or docking mechanism) and to drive onto solar table 104. In response, robotic cleaner 128A may provide a response communication to autonomous robot 116' that it is disengaging its magnetic arm (for example) and driving onto solar table 104.

In one embodiment of the disclosed technique, the height of platform 132 is adjusted such that when extension portion 126 is extended and substantially touches the outer frame of solar table 104, the outer frame is slightly higher than the upper surface of extension portion 126. The slight difference in height may range from a few millimeters to a few centimeters. The slight difference in height may be used as an indication to robotic cleaner 128A that it is mounting onto solar table 104 as additional drive force may be required from its wheels to overcome the slight height difference, thus providing an indication that it has indeed mounted onto solar table 104. Once robotic cleaner 128A has fully mounted onto solar table 104, it may provide a response command to autonomous robot 116' that it has mounted solar table 104 and extension portion 126 can be retracted and platform 132 can be lowered. This response command also indicates to autonomous robot 116' to stay parked at the given solar row until robotic cleaner 128A has cleaned the entire surface of all solar tables in the given solar row.

Once robotic cleaner 128A has confirmed it is fully on solar table 104, it will begin to clean the surface of all the solar tables of a given solar row using its cleaning mechanism (either with a liquid or without using a liquid). Robotic cleaner 128A may provide a start clean command to autonomous robot 116' to indicate that it has started to clean the solar tables of the given solar row. When robotic cleaner 128A has finished cleaning all the surfaces of a given solar row according to its cleaning mechanism and cleaning pattern, it may return to a waiting position on solar table 104 adjacent to where it first drove onto solar table 104 and provide a wait command to autonomous robot 116' that it has finished cleaning and is waiting for autonomous robot 116' to be ready to receive it. The processor of autonomous robot 116' then provides a command to the vertical lift mechanism to raise platform 132 to the height of solar table 104 and also to angle its tilt angle to match the tilt angle of solar table 104 as mentioned above. The processor also gives a command to extend extension portion 126 towards solar table 104. When receiving robotic cleaner 128A back onto extension portion 126, platform 132 may be raised slightly higher so that there is a slight difference in height between the upper surface of solar table 104 and the upper surface of extension portion 126 such that robotic cleaner 128A can detect when it has fully mounted onto extension portion 126. Autonomous robot 116' then provides a receive command to robotic cleaner 128A that it is ready to have robotic cleaner 128A drive onto extension portion 126. Robotic cleaner 128A then provides a command that it is mounting extension portion 126 and begins driving onto extension portion 126. Once robotic cleaner 128A has fully mounted onto extension portion 126 it may engage its magnetic arm (or parking or docking mechanism) to magnetically couple to extension portion 126. Once the magnetic arm is fully engaged, robotic cleaner 128A may provide a retract and lower command to autonomous robot 116' that extension portion 126 may be retracted and platform 132 may be lowered. Autonomous robot 116' then retracts extension portion 126 and lowers platform 132 and provides a command to plurality of wheels 118 to drive to the subsequent solar row where the communication and coordination of cleaning a solar row between robotic cleaner 128A and autonomous robot 116', as described above, occurs again.

Figure 3:
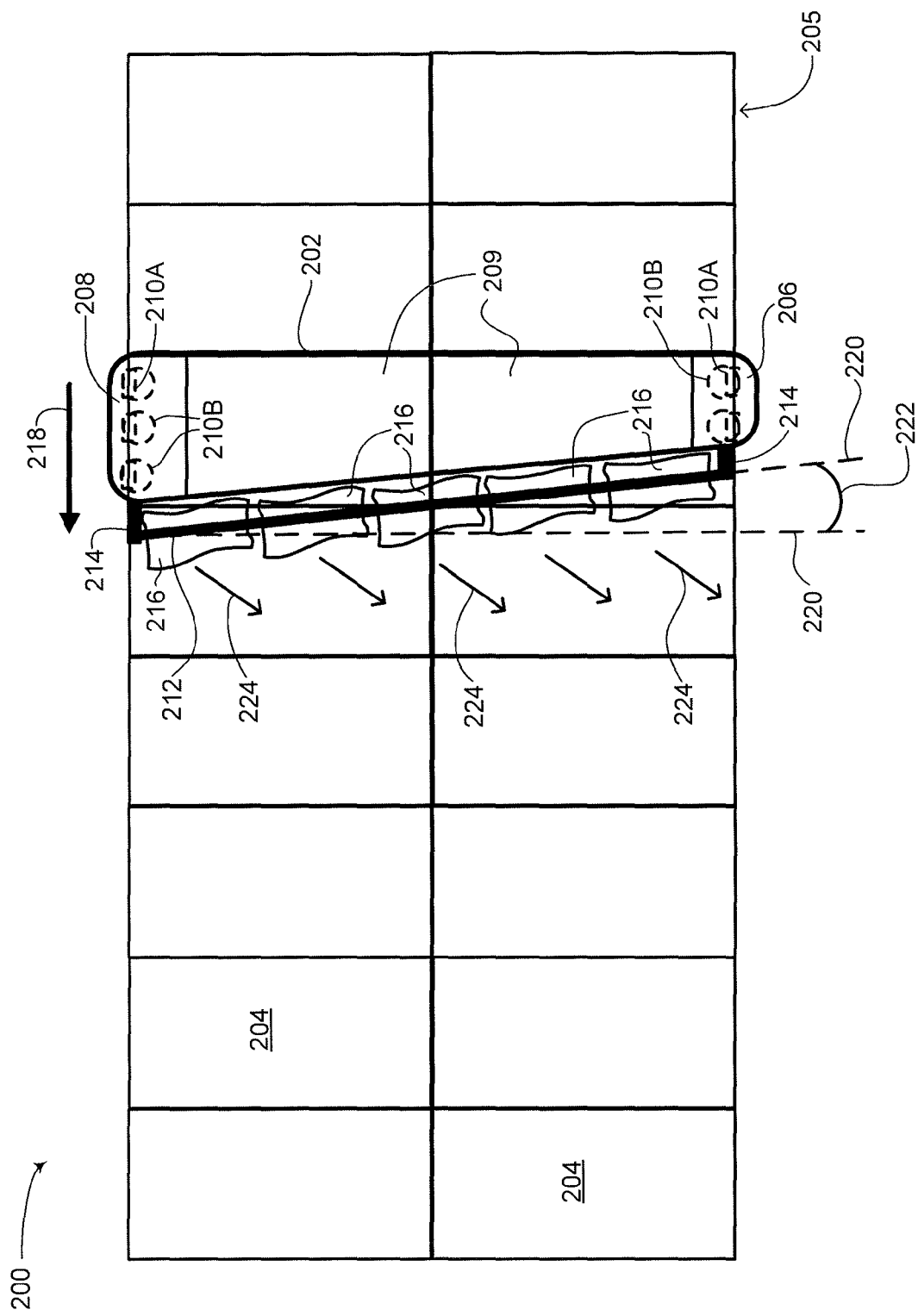
FIG. 3 is a schematic top view drawing of a solar tracker cleaning robot cleaning a solar row, constructed and operative in accordance with a further embodiment of the disclosed technique.

Reference is now made to FIG. 3 which is a schematic top view drawing of a solar tracker cleaning robot cleaning a solar row, generally referenced 200, constructed and operative in accordance with a further embodiment of the disclosed technique. FIG. 3 shows a solar tracker cleaning robot 202 cleaning a row of solar trackers 204. As shown solar tracker cleaning robot 202 has a trapezoidal shape with a bottom section 206 and a top section 208. The area between bottom section 206 and top section 208, shown as middle section 209, may be hollow and simply a frame. Either one of bottom section 206 and top section 208 may house electronics (not shown) for operating the cleaning robot and can also include at least one rechargeable power source (not shown) such as a battery, as well as telecommunication components (not shown) such as a wireless transmitter, a wireless receiver and the like for sending and receiving wireless signals. The telecommunication components can be embodied as a wireless communicator (not shown). As shown, top section 208 is positioned at the upper end of solar trackers 204 whereas bottom section 206 is positioned at the lower end of solar trackers 204 such that the row of solar trackers 204 forms an angle with the horizontal (not shown). The angle of the row of solar trackers may be a specific cleaning angle at which solar trackers 204 are positioned when they are to be cleaned. The cleaning angle can be 20°, 30°, 35°, 40° and the like. In the case of solar trackers 204 being embodied as fixed angle solar tables, the fixed angle of the solar tables would be the cleaning angle.

As shown, solar tracker cleaning robot 202 has a length (i.e., from top section 208 to bottom section 206) which is substantially the length of a solar tracker and moves in the direction of an arrow 218 across the width direction of the row of solar trackers. In this manner, cleaning robot 202 can clean the surface of the row of solar trackers in a single pass. This is described in further detail below. As shown each of top section 208 and bottom section 206 includes a plurality of vertical wheels 210A and horizontal wheels 210B. Schematically shown are two vertical and horizontal wheels in bottom section 206 and three vertical and horizontal wheels in top section 208, however this is merely schematic and fewer or more wheels can be installed in each section. Vertical wheels 210A enable cleaning robot 202 to roll over frame 205 of solar trackers 204 whereas horizontal wheels 210B ensure that cleaning robot 202 remains coupled with solar trackers 204 and does not fall off. The layout of vertical wheels 210A and horizontal wheels 210B is described in greater detail below in FIG. 4. At least one of bottom section 206 and top section 208 includes at least one motor (not shown) for driving at least one of plurality of vertical wheels 210A and plurality of horizontal wheels 210B. The at least one motor can drive the vertical and horizontal wheels in a forward and backward direction over solar trackers 204.

Cleaning robot 202 also includes a lengthwise cylinder 212 which is coupled with two extensions 214 which extend respectively from bottom section 206 and top section 208. Extensions 214 enable lengthwise cylinder 212 to rotate freely. At least one of extensions 214 can house at least one motor (not shown) for rotating lengthwise cylinder 212. The motor for rotating the lengthwise cylinder can also be located in at least one of bottom section 206 and/or top section 208. Coupled with lengthwise cylinder 212 is a plurality of microfiber fins 216 which rotate as lengthwise cylinder 212 rotates. As shown, the body of cleaning robot 202 has a trapezoidal shape wherein top section 208 extends slightly forward from bottom section 206. As shown by a plurality of lines 220, lengthwise cylinder 212 forms an angle 222 with a vertical line (not labeled) parallel to the lengthwise direction of solar trackers 204. As top section 208 is positioned higher than bottom section 206 in terms of height, then as plurality of microfiber fins 216 rotate, dirt, dust and debris on the surface of solar trackers 204 is pushed down the slope of solar trackers 204 in the direction as shown by a plurality of arrows 224. In this respect as cleaning robot 202 moves across the surface of solar trackers 204, dust, dirt and debris is cleaned off the surface without the use of water or any liquid for that matter, by the rotating motion of the plurality of microfiber fins in the general direction of plurality of arrows 224. Dust, dirt and debris is thus pushed across the surface of solar trackers 204 in a downwards direction towards the lower end of solar trackers 204. The bottom most one (not labeled) of plurality of microfiber fins 216 thus effectively pushes the accumulated dust, dirt and debris off the surface of solar trackers 204. It is noted that plurality of microfiber fins 224 can be embodied as other kinds of fins, paddles, sweeps and/or brushes. It is also noted that the height of lengthwise cylinder 212 can be adjusted by at least one actuator (not shown), located within extensions 214. Thus the pressure which microfiber fins 216 exert of the surface of solar trackers 204 while they rotate can be adjusted. For example, in the case of heavier soiling or when the solar trackers are covered with snow, the actuator may position lengthwise cylinder 212 closer to the surface of solar trackers 204 to increase the pressure the microfiber fins exert on the solar tracker surface.

Figure 4:
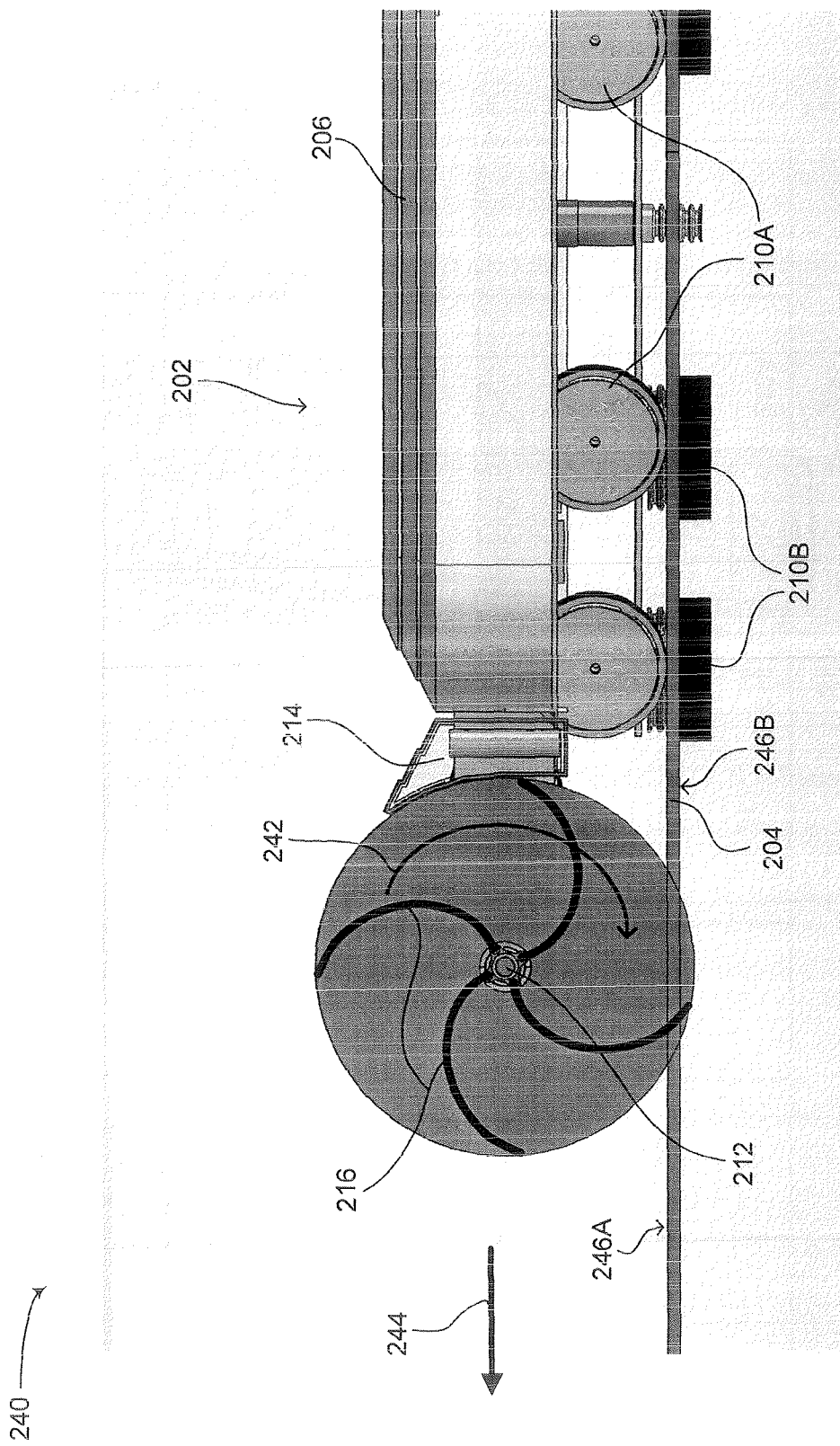
FIG. 4 is a schematic side view drawing of the solar tracker cleaning robot of FIG. 3, constructed and operative in accordance with another embodiment of the disclosed technique.

Reference is now made to FIG. 4 which is a schematic side view drawing of the solar tracker cleaning robot of FIG. 3, generally referenced 240, constructed and operative in accordance with another embodiment of the disclosed technique. Identical elements in FIGS. 3 and 4 are labeled using identical numbers. As shown, a side view of cleaning robot 202 is shown from the side of bottom section 206. Clearly shown is plurality of vertical wheels 210A (in FIG. 4 three vertical wheels are shown) which can roll over an upper surface 246A of solar trackers 204. Plurality of horizontal wheels 210B are also shown, being positioned perpendicularly to the direction of vertical wheels 210A and also being positioned under a bottom surface 246B of solar trackers 204. The horizontal wheels enable cleaning robot 202 to roll over solar trackers 204 whereas the vertical wheels ensure that cleaning robot 202 remains in contact and aligned with the surfaces (246A and 246B) of solar tracker 204. Shown schematically are lengthwise cylinder 212, one of extensions 214 and plurality of microfiber fins 216. In this embodiment, four microfiber fins are shown however fewer or more fins are possible (for example, a single fin, two fins, five fins, eight fins and the like). An arrow 242 shows the direction in which lengthwise cylinder 212 rotates which pushes dust, dirt and debris on upper surface 246A in the direction of an arrow 244. Thus cleaning robot 202 pushes dust, dirt and debris forward as it rolls over the upper surface of solar tracker 204. Due to the angle which solar tracker 204 may be positioned at when cleaning robot 202 moves over upper surface 246A, dirt, dust and debris is not just pushed forward but also downwards over the surface of the solar tracker.

Figure 5:
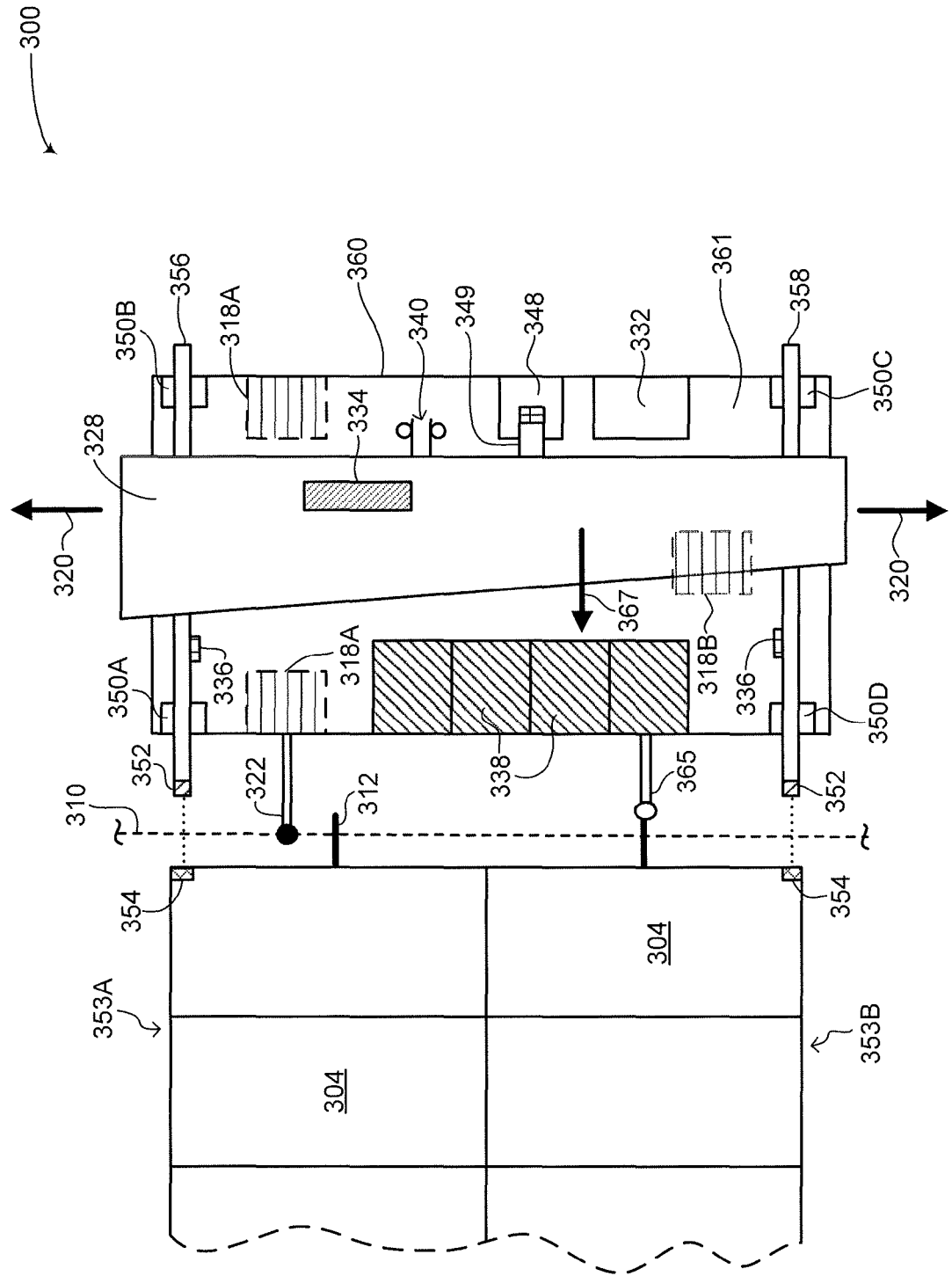
FIG. 5 is a schematic top view drawing of an autonomous robot for transferring the solar tracker cleaning robot of FIG. 3 from solar row to solar row, constructed and operative in accordance with a further embodiment of the disclosed technique.

Reference is now made to FIG. 5 which is a schematic top view drawing of an autonomous robot for transferring the solar tracker cleaning robot of FIG. 3 from solar row to solar row, generally referenced 300, constructed and operative in accordance with a further embodiment of the disclosed technique. A row of solar trackers 304 is shown (similar to row of solar trackers 204 in FIGS. 3 and 4). Solar trackers 304 can rotate their angle (not shown) and can be positioned at a cleaning angle (not shown) when it is time for them to be cleaned (usually at night when they do not produce electricity). Shown as well is a cleaning robot 328, which is substantially similar to solar tracker cleaning robot 202 (FIG. 3). Cleaning robot 328 is shown schematically without all of its parts to simplify the understanding of the disclosed technique. Not shown are the microfiber fins nor the wheels of cleaning robot 328 however such elements form a part of cleaning robot 328 as described above in FIGS. 3 and 4. All that is shown of cleaning robot 328 is its general trapezoidal shape as well as a rechargeable power source 334, which can be embodied as a rechargeable battery.

FIG. 5 shows an autonomous robot 360 for transporting cleaning robot 328. Autonomous robot 360 is another embodiment of an autonomous robot for transporting a cleaning robot from solar row to solar row and shares certain elements in common with autonomous robot 116 (FIG. 1). Autonomous robot 360 includes a platform 361, substantially embodied as a flat rectangular surface. On the underside of platform 361 are attached two front wheels 318A and one back wheel 318B, shown in hatched lines. It is noted that even though autonomous robot 360 is shown with three wheels other wheel arrangements are possible (four wheels, five wheels or more). In one embodiment, autonomous robot 360 also includes at least one drive motor (not shown) for driving at least one of front wheels 318A and back wheel 318B. In another embodiment, autonomous robot 360 can include respective drive motors (not shown) for each one of front wheels 318A and back wheel 318B, thereby increasing the maneuverability of autonomous robot 360. Autonomous robot 360 further includes a plurality of solar panels 338, at least one rechargeable power source 332, a parking assembly 348, a plurality of pistons 350A, 350B, 350C and 350D, at least two tilt sensors 336, at least two proximity sensors 322 (only one is shown in FIG. 5), a stop sensor 365, at least two positioning sensors 352, an upper rail 356, a lower rail 358 and a dynamic charge connector 340. Dynamic charge connector 340 and parking assembly 348 are optional elements in autonomous robot 360. Autonomous robot 360 may also include a processor (not shown) and a wireless communication unit (not shown) for transmitting and receiving signals wirelessly. Plurality of solar panels 338 are coupled with at least one power source 332. Upper rail 356 is coupled with pistons 350A and 350B and lower rail 358 is coupled with pistons 350C and 350D. Cleaning robot 328 rests on upper rail 356 and lower rail 358. In particular, the horizontal and vertical wheels (not shown) of cleaning robot 328 respectively rest below and above the upper and lower rails thereby coupling cleaning robot 328 to the rails and enabling the cleaning robot to move over the rails. In the embodiment which includes the optional elements of dynamic charge connector 340 and parking assembly 348, dynamic charge connector 340 is electrically coupled with at least one power source 332. When cleaning robot 328 is positioned on upper rail 356 and lower rail 358 and is coupled with parking assembly 348, dynamic charge connector 340 is also electrically coupled with at least one rechargeable power source 334.

Plurality of pistons 350A-350D can each be independently raised and lowered, thereby enabling upper rail 356 and lower rail 358 to be raised and lowered and to be angled at different angles and heights. As explained below, the independent movement of pistons 350A-350D enables upper rail 356 and lower rail 358 to be positioned and leveled regardless of the terrain autonomous robot 360 is situated on. This is especially the case when the terrain is bumpy, rocky, hilly or simply not flat. At least two tilt sensors 336 (at least one per rail) can thus be used to determine the tilt of each rail. At least one tilt sensor can determine the tilt between pistons 350A and 350B and at least another tilt sensor can determine the tilt between pistons 350C and 350D.

FIG. 5 shows a guiding cable 310 which is positioned over a plurality of cable supports 312 extending from solar trackers 304. Plurality of cable supports 312 can be embodied as hooks, screws or elements attached to the support structure (not shown) of solar trackers 304. Guiding cable 310 is positioned and held in place via a plurality of cable supports 312 and is thus suspended above the ground (for example at a height of one meter). At least two proximity sensors 322 are used to guide autonomous robot 360 in the direction of arrows 320 using guiding cable 310. For example, guiding cable 310 may be made from a metal and the proximity sensors may be able to detect the presence of metal. A processor (not shown) in autonomous robot 360 may thus change the amount of rotation of any one of front wheels 318A and back wheel 318B based on the detection of proximity sensors 322 to guiding cable 310, thereby enabling autonomous robot 360 to move from solar row to solar row. Stop sensor 365, similar to proximity sensors 322, may be used to indicate that autonomous robot 360 has moved sufficiently from one solar row to the next solar row and is aligned with the solar row. As shown in FIG. 5, upper rail 356 is aligned with an upper extremity 353A of solar tracker 304 and lower rail 358 is aligned with a lower extremity 353B of solar tracker 304. Stop sensor 365 thus indicates to autonomous robot 360 that front wheels 318A and back wheel 318B have moved autonomous robot 360 enough in the direction of one of arrows 320 that it is sufficiently aligned with a row of solar trackers. As mentioned above, guiding cable 310 may be positioned on the ground or may be buried in the ground to a depth of a few centimeters. In such an embodiment, cable supports 312 are not needed. Guiding cable 310 may be embodied as a passive guide for autonomous robot 360 or an active guide. As shown in FIG. 5, guiding cable 310 acts as a passive guide with at least two proximity sensors 322 actively sensing their proximity to guiding cable 310 and thus the proximity of autonomous robot 360 to guiding cable 310. However as described above, guiding cable 310 may be embodied as a perimeter guidance cable which actively transmits energy and/or generates an electromagnetic field in at least one specific frequency range. In this embodiment (not shown), the at least two proximity sensors may passively sense the emitted energy in the specific frequency range and thus the proximity of autonomous robot 360 to guiding cable 310.

Cleaning robot 328 is used to clean the surface of solar trackers 304. As mentioned above, solar trackers 304 may be placed at a cleaning angle for cleaning. In order for cleaning robot 328 to disengage from autonomous robot 360 and clean the surface of solar trackers 304, as shown in the direction of an arrow 367, cleaning robot 328 must be angled at the cleaning angle of solar trackers 304 and must also be positioned at the same height of solar trackers 304. According to the disclosed technique, once stop sensor 365 has horizontally aligned autonomous robot 360 with a row of solar trackers, cleaning robot 328 is disengaged from parking assembly 348 and dynamic charge connector 340, thereby enabling pistons 350A-350D to move and position upper rail 356 and lower rail 358. As mentioned above, since parking assembly 348 and dynamic charge connector 340 are optional elements, pistons 350A-350D may start to move the position of both upper rail 356 and lower rail 358 once stop sensor 365 indicates that autonomous robot 360 is horizontally aligned with a row of solar trackers. Tilt sensors 336 along with plurality of pistons 350A-350D are then used to position upper rail 356 and lower 358 such that they are substantially flat, each having a tilt of 0°. In one embodiment, upper rail 356 may be positioned higher than lower rail 358, even though both rails are positioned in a substantially flat position having a tilt angle of 0°. In another embodiment, both upper rail 356 and lower rail 358 may be positioned such that they are flat and also at the same height thus positioning cleaning robot 328 also in a flat position. In general, this is particularly useful in the case when the terrain (not shown) over which autonomous robot 360 travels over is not flat, therefore even if platform 361 is not flat, upper and lower rails 356 and 358 can be positioned such that they are flat. Once upper and lower rails 356 and 358 are independently positioned in a flat position via pistons 350A-350D, pistons 350A-350D begin further raising upper and lower rails 356 and 358 such that at least two positioning sensors 352 are in line respectively with at least two reflectors 354 positioned on lower extremity 353B and upper extremity 353A of solar tracker 304. Positioning sensors 352 may be embodied as IR detectors or other types of detectors which emit electromagnetic radiation and receive reflections of the emitted electromagnetic radiation. For example, pistons 350A-350D may begin to simultaneously raise upper and lower rails 356 and 358 until the positioning sensor in line with pistons 350C and 350D receives reflections from reflector 354 positioned in line with lower extremity 353B at which point pistons 350C and 350D stop raising lower rail 356. Pistons 350A and 350B may continue raising upper rail 356 until the positioning sensor in line with pistons 350A and 350B receives reflections from reflector 354 positioned in line with upper extremity 353A at which point pistons 350A and 350B stop raising upper rail 356. At this point, pistons 350A-350D have raised cleaning robot 328 such that it is at the same angle and the same height as solar tracker 304 and thus vertically aligned with solar tracker 304. This is only one example of how pistons 350A-350D can be used to align cleaning robot 328 with solar tracker 304. Other procedural controls are possible, for example, first aligning upper rail 356 with the upper extremity and then aligning lower rail 358 with the lower extremity, or vice-versa.

Once cleaning robot 328 is aligned with solar tracker 304, the at least one motor (not shown) in cleaning robot 328 then rotates its wheels (not shown) and drives cleaning robot 328 from upper and lower rails 356 and 358 onto solar tracker 304 in the direction of arrow 367 to clean its surface, for example, without water or without a liquid. In one embodiment, proximity sensors 322 maneuver autonomous robot 360 sufficient close to solar trackers 304 such that cleaning robot 328 can roll over the gap between solar trackers 304 and autonomous robot 360 without difficulty. For example, if the gap is less than 50 centimeters and cleaning robot is at least 50 centimeters wide and includes a plurality of wheels, as cleaning robot 328 rolls off upper and lower rails 356 and 358 it will roll onto upper and lower extremities 353A and 353B of solar tracker 304 without falling. In another embodiment, upper and lower rails 356 and 358 may each be equipped with an actuator for extending and retracing the rails towards and from solar tracker 304, therefore moving upper and lower rails 356 and 358 over the gap between solar trackers 304 and autonomous robot 360.

Autonomous robot 360 includes a plurality of solar panels 338 which are used to charge at least one rechargeable power source 332. The microfiber fins (not shown) of cleaning robot 328 can already begin to rotate as cleaning robot 328 moves off of upper and lower rails 356 and 358 to clean plurality of solar panels 338, thus maintaining their efficiency in generating power for charging power source 332. Cleaning robot 328 can include a retractable arm 349 which can be engaged and disengaged. For example, retractable arm 349 may be made from a magnetic material and parking assembly 348 can be made from a ferromagnetic material. When cleaning robot 328 has finished cleaning solar trackers 304 and drives back onto autonomous robot 360, upper and lower rails 356 and 358 are lowered via pistons 350A-350D such that cleaning robot 328 can use retractable arm 349 which can be engaged to lock and dock cleaning robot 328 with parking assembly 348. Cleaning robot 328 can thus also couple electrically with autonomous robot 360 via dynamic charge connector 340. Thus cleaning robot 328 will not move while autonomous robot 360 drives to another solar row to clean it. It is noted that other parking and docking mechanisms can be used to dock and park cleaning robot 328 with autonomous robot 360. It is also noted that cleaning robot 328 may not be parked and electrically coupled with power source 332 as autonomous robot 360 drives from one solar row to another. Pistons 350A-350D may be lowered and/or angled such that cleaning robot 328 is substantially flat and thus little worry that cleaning robot 328 will move as autonomous robot 360 is moved from solar row to solar row.

Power source 332 is used to drive autonomous robot 360 and also to operate pistons 350A-350D as well as all the electronics of autonomous robot 360. Power source 332 can also be used to charge rechargeable power source 334. When cleaning robot 328 is docked and parked in parking assembly 348, cleaning robot 328 can be electrically coupled with dynamic charge connector 340, which electrically couples cleaning robot 328 with power source 332. Thus while autonomous robot 360 drives from solar row to solar row, rechargeable power source 334 can be recharged from rechargeable power source 332. In general cleaning robot 328 should be as lightweight as possible to increase its energy efficiency. One of the main components which weighs down cleaning robot 328 is its own power source. In many cleaning robots, the power source is the main component which adds significant weight to the cleaning robot. According to the disclosed technique, the weight of rechargeable power source 334 can be minimized as cleaning robot 328 can be recharged each time it returns to autonomous robot 360. As autonomous robot 360 is not subject to the same weight constraints of cleaning robot 328, as it does not need to drive over the surface of solar panels, rechargeable power source 332 can be significantly large and can store substantial charge. Thus rechargeable power source 334 can be small enough to maintain enough charge to only clean one or possibly just two solar tracker rows. Using fast charging technology, rechargeable power source 334 can be charged sufficiently from power source 332 as autonomous robot 360 moves from solar row to solar row. For example, a quick charge of power source 334 from 60% to 80% may be possible from power source 332 in a matter of minutes which may be the time it takes autonomous robot 360 to move from one solar row to an adjacent solar row. That amount of charge may be sufficient for cleaning robot 328 to clean an entire solar tracker row and return to autonomous robot 360.

It is noted as well that the wireless communication unit (not shown) of autonomous robot 360 can communicate with the wireless communicator (not shown) of cleaning robot 328. This is so the movement of autonomous robot 360 can be coordinated with the cleaning performed by cleaning robot 328. For example, such communication is necessary for autonomous robot 360 to ascertain that cleaning robot 328 has returned to autonomous robot 360 before autonomous robot 360 moves in the direction of arrows 320.

Figure 6:
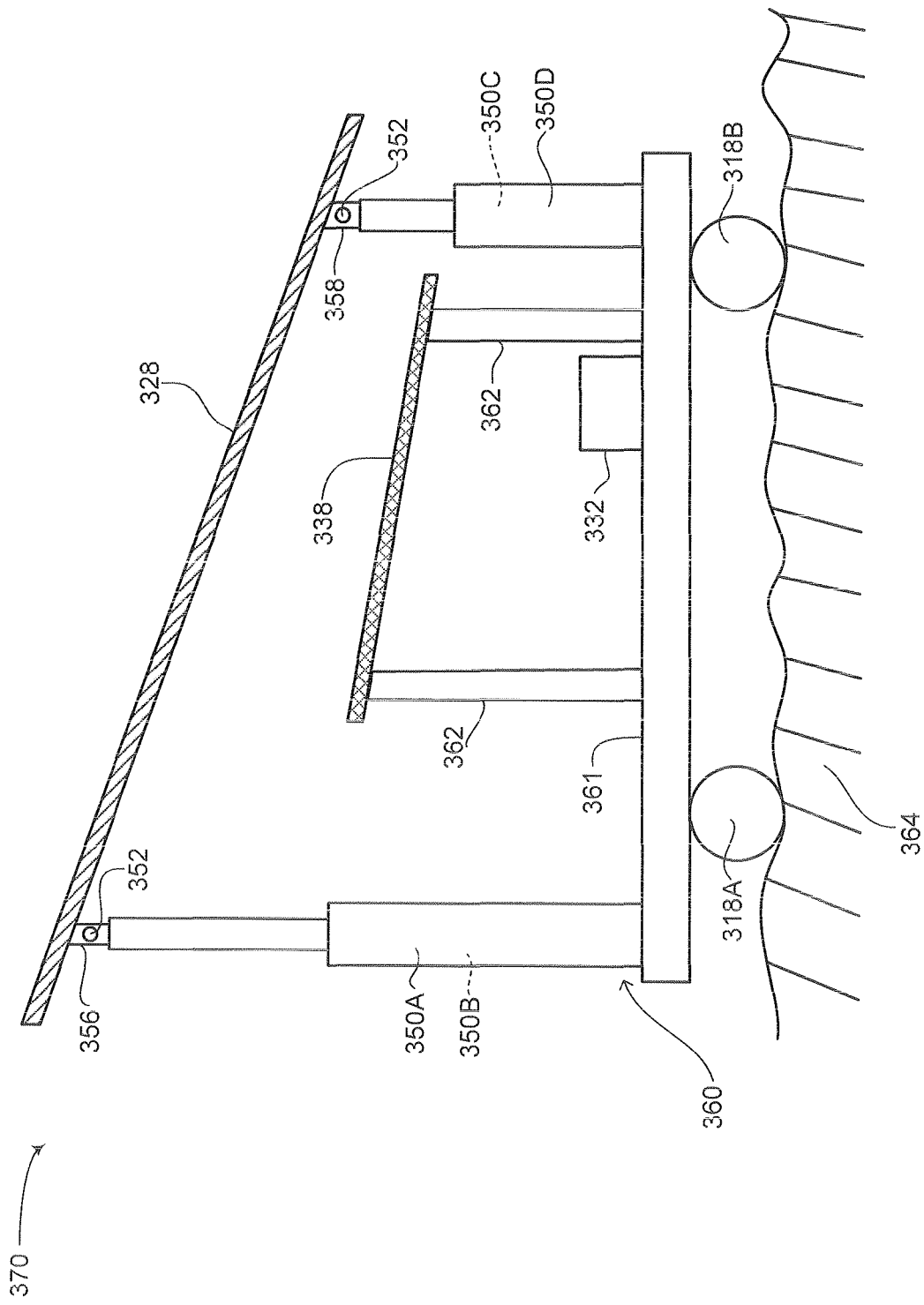
FIG. 6 is a schematic side view drawing of the autonomous robot of FIG. 5, for transferring the solar tracker cleaning robot from solar row to solar row, constructed and operative in accordance with another embodiment of the disclosed technique.

Reference is now made to FIG. 6 which is a schematic side view drawing of the autonomous robot of FIG. 5, generally referenced 370, for transferring the solar tracker cleaning robot from solar row to solar row, constructed and operative in accordance with another embodiment of the disclosed technique. Identical elements between FIGS. 5 and 6 are labeled using identical numbers. As can be seen from a side view, front wheels 318A and back wheel 318B may travel over a terrain 364 between adjacent rows of solar trackers. Unlike the prior art, terrain 364 does not need to be flattened or processed for the disclosed technique to function and operate. As can be seen as well, autonomous robot 360 substantially includes platform 361 which may or may not be level over terrain 364. Pistons 350A-350D can raise and lower upper rail 356 and lower rail 358 such that cleaning robot 328 can be raised and also angled to the height and angle of a solar tracker to be cleaned. As shown as well, positioning sensors 352 are shown which can align with reflectors (not shown) positioned on the solar tracker. Shown as well is rechargeable power source 332 which is positioned on platform 361. As can be seen as well is plurality of solar panels 338 which are positioned on a mounting structure 362 which is coupled with platform 361. As shown, the height of solar panels 338 may not be the same height as the solar tracker to be cleaned. Thus either after or before cleaning robot 328 cleans a solar tracker, pistons 350A-350D may be used to adjust the height of cleaning robot 328 such that it can be used to clean the surface of solar panels 338.

Figure 7:
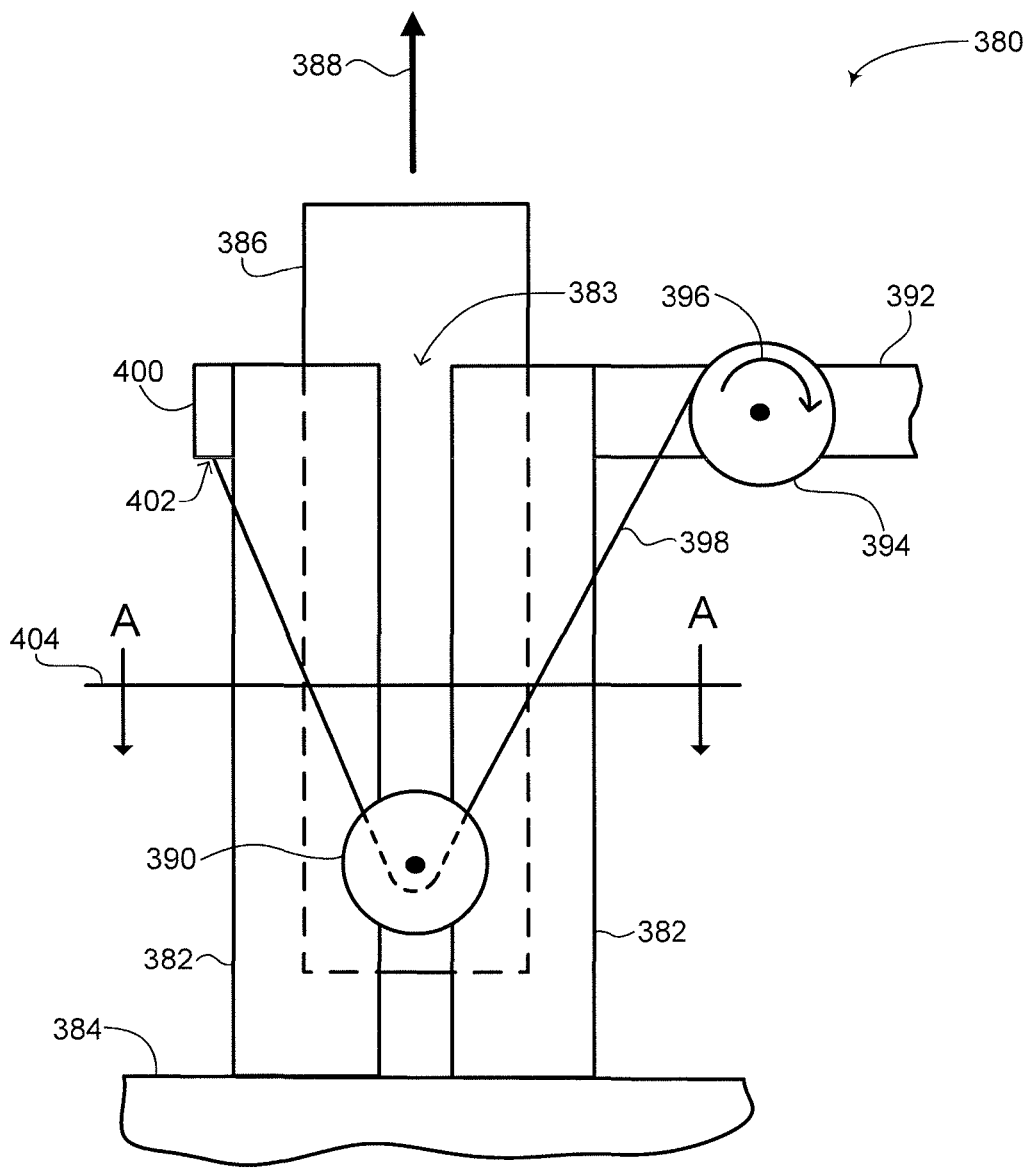
FIG. 7 is a schematic side view and cross-sectional view of a piston used in the autonomous robot of FIG. 5, constructed and operative in accordance with a further embodiment of the disclosed technique.
Figure 7:
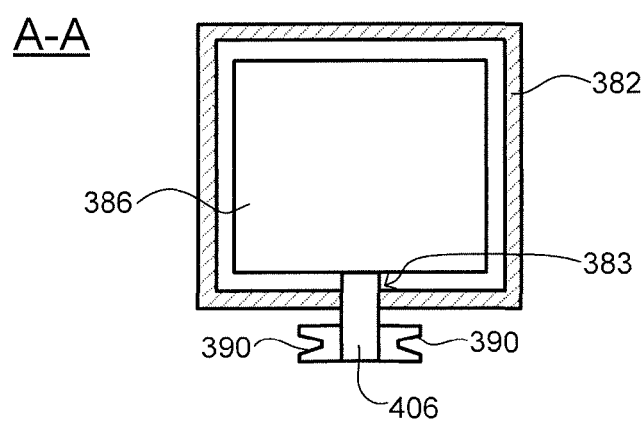

Reference is now made to FIG. 7 which is a schematic side view and cross-sectional view of a piston used in the autonomous robot of FIG. 5, generally referenced 380, constructed and operative in accordance with a further embodiment of the disclosed technique. FIG. 7 shows an example of one of pistons 350A-350D shown above in FIGS. 5 and 6. Piston 380 includes an outer profile 382 and an inner profile 386. Outer profile 382 is coupled with a platform 384 (similar to platform 361 in FIG. 5). Outer profile 382 includes a gap 383. An extension through gap 383 couples inner profile 386 with a wheel 390. Coupled with outer profile 382 is an anchoring element 400 and a support element 392. Support element 392 includes a motor (not shown) which is coupled to a wheel 394. As shown a cable 398 is anchored to anchoring element 400 at a point 402, is threaded through wheel 390 and is attached to wheel 394. The motor rotates wheel 394 in the direction of an arrow 396, thereby winding cable 398 around wheel 394 and thus lifting inner profile 386 in the direction of an arrow 388. The motor may be a DC motor and can operate at low speeds such as 20-40 revolutions per minute (RPM) or at higher speeds of 100 RPM or even higher. A cross-section A-A of piston 380 is shown via cross-section arrows 404.

As shown in cross-section A-A, outer profile 382 is shown with gap 383. Clearly shown is inner profile 386 with an extension 406. Wheel 390 is positioned around extension 406. Thus as cable 398 (not shown in the cross-section) threads through wheel 390 and increases in tension, extension 406 is raised thereby raising inner profile 386.

Figure 8A:
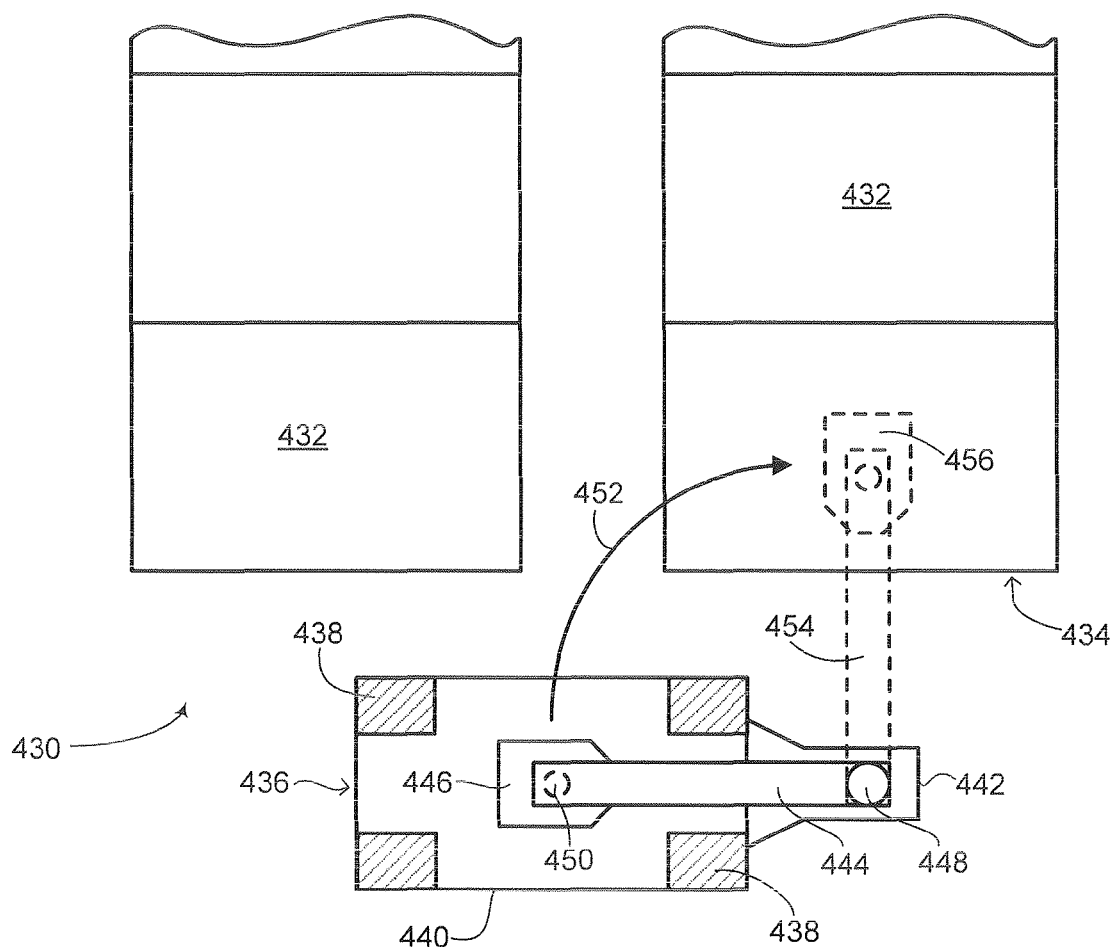
FIGS. 8A-8B are schematic top view and side view drawings of another autonomous robot for transferring the solar tracker cleaning robot of FIG. 1 from solar row to solar row, constructed and operative in accordance with another embodiment of the disclosed technique.
Figure 8B:
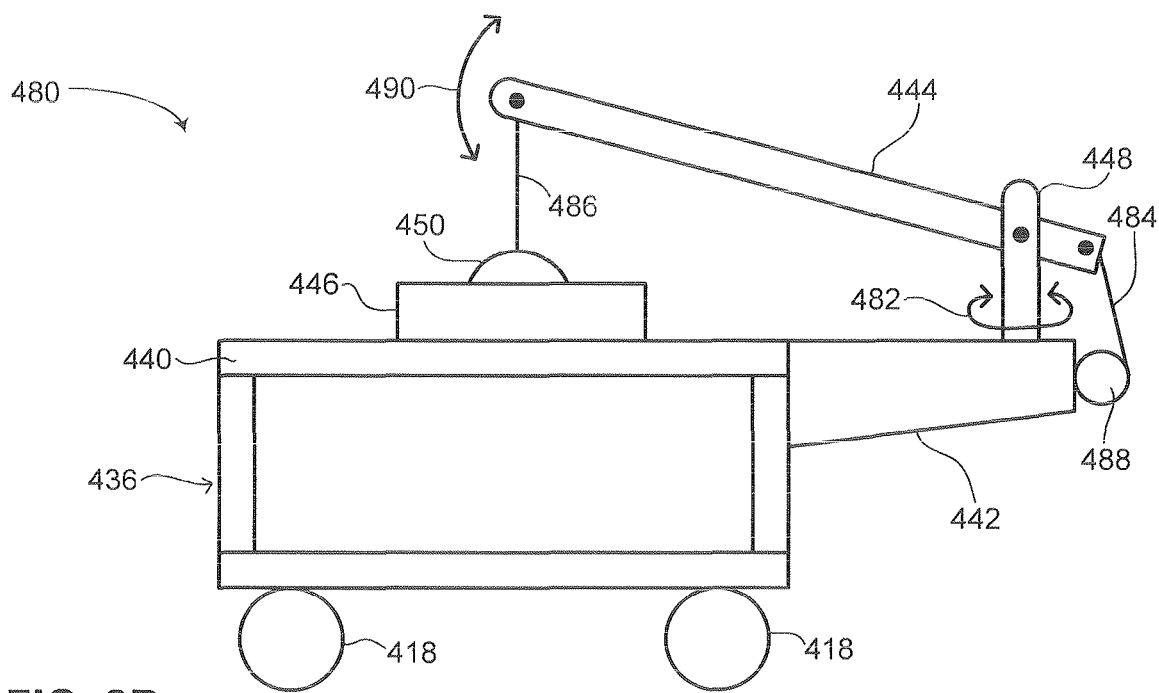

Reference is now made to FIGS. 8A and 8B which are respectively a schematic top view drawing and a schematic side view drawing of another autonomous robot for transferring the solar tracker cleaning robot of FIG. 1 from solar row to solar row, generally referenced 430 and 480 respectively, constructed and operative in accordance with another embodiment of the disclosed technique. With reference to FIG. 8A, shown is another autonomous robot 436 for transferring a robotic cleaner 446 from one solar row 434 to another solar row. As shown, each solar row 434 includes a plurality of solar tables 432. Autonomous robot 436 is similar to autonomous robot 116 (FIG. 1) and includes similar components. Specifically shown in FIG. 8A is a plurality of wheels 438, a main body 440, an extension section 442 and an extending arm 444. Autonomous robot 436 also includes at least one drive motor (not shown), a communication unit for receiving and transmitting wireless signals (not shown), a processor (not shown), a rechargeable power source (not shown), a stop sensor (not shown) and at least two proximity sensors (not shown), all of which are omitted from FIG. 8A for reasons of simplicity in understanding the disclosed technique. Autonomous robot 436 may also include a dynamic charge connector (not shown) and a parking assembly (not shown), similar to what was described above in FIG. 5, for anchoring and parking robotic cleaner 446 while autonomous robot 436 moves from solar row to solar row. The dynamic charge coupled can be used to recharge a rechargeable battery (not shown) on robotic cleaner 446 by electrically coupling the rechargeable battery on robotic cleaner 446 to the rechargeable power source on autonomous robot 436. Autonomous robot 436 can also include a plurality of solar panels (not shown) for charging the rechargeable power source.

Main body 440 can be navigated and maneuvered via plurality of wheels 438 with the use of proximity sensors and either reflectors (not shown) positioned on solar tables 432 and/or a guiding cable (not shown) positioned adjacent to and along the width direction of solar row 434, as described above in reference to FIGS. 1 and 5. A stop sensor on main body 440 is used to indicate to autonomous robot 436 that it is horizontally aligned with a solar row and that the robotic cleaner can be transferred to the solar row to clean it, as was described above, for example, in FIG. 5. Extension section 442, which is coupled with main body 440, includes a vertical arm 448 and extending arm 444. Vertical arm 448 is coupled with extension section 442 and is coupled with a motor (not shown), enabling vertical arm to rotate about its axis. Extending arm 444 is coupled with vertical arm 448 and can alter its vertical angle (shown in detail in FIG. 8B). Extending arm 444 is attachable and detachable from robotic cleaner 446 via a connector 450. As shown by an arrow 452, vertical arm 448 can rotate, thereby transporting robotic cleaner 446 from main body 440 to solar row 434. The amount of rotation of vertical arm 448 may be predetermined, for example 90°. Extending arm 444 is shown with robotic cleaner 446 in dashed lines as an extending arm 454 and a robotic cleaner 456, showing the rotation and movement of robotic cleaner 446 from main body 440 to solar row 434.

Using proximity sensors and/or a guiding cable, and also knowing the length of extending arm 444, autonomous robot 436 can be brought to a position relative to solar row 434 such that when extending arm 444 is rotated, for example 90°, robotic cleaner 446 will be positioned on solar row 434. Extending arm 444 and vertical arm 448 substantially function like a crane for lifting robotic cleaner 446 from main body 440 and positioning robotic cleaner 446 on solar row 434 so it can clean the surface of plurality of solar tables 432. Once robotic cleaner 446 is finished cleaning plurality of solar tables 432, it can be brought back to its initial start position, wherein extending arm 444 and vertical arm 448 are used to remove robotic cleaner 446 from solar row 434 and return it to main body 440. Autonomous robot 436 can then be navigated to the next solar row using the proximity sensors and/or guiding cable.

Robotic cleaner 446 is substantially similar to robotic cleaner 128A (FIG. 1) and can be embodied as any robotic cleaner capable of navigating over a solar panel surface autonomously. In addition, connector 450 can be embodied as any kind of element or structure for securely gripping robotic cleaner 446 and transporting it to and from main body 440 to solar row 434. For example, connector 450 may be embodied as an electromagnet for attaching itself and detaching itself from robotic cleaner 446. In such an embodiment, robotic cleaner 446 may include a ferromagnetic element on its upper surface (not shown) for magnetically coupling with and decoupling with connector 450. Connector 450 may also be embodied as a claw, vice or grip for securely fastening itself with robotic cleaner 446 for moving it to and from main body 440 to solar row 434.

With reference to FIG. 8B, autonomous robot 436 is shown from a side perspective view. Equivalent elements between FIGS. 8A and 8B are shown using identical reference numbers. As shown are plurality of wheels 418 and the general structure of autonomous robot 436. As seen, and unlike autonomous robot 116 (FIG. 1), main body 440 of autonomous robot 436 has a fixed height. The height of autonomous robot 436 may be similar to the height of a solar row. Extension section 442 extends from and is coupled to main body 440. Vertical arm 448 and extending arm 444 are clearly shown with an arrow 482 showing the rotation movement of vertical arm 448 around its axis and with an arrow 490 showing the movement and change of height of extending arm 444. Vertical arm 448 and extending arm 444 are long enough to function as a crane for raising and placing robotic cleaner 446 from main body 440 onto a solar row. Extending arm 444 may be coupled with a winch (not labeled) including a cylinder 488 and a cable 484. Cylinder 488 may be coupled with a motor (not shown) for rotating cable 484 around cylinder 488. The direction of rotation of the motor can either raise or lower the height of extending arm 444. Shown as well is a cable 486, extending from one end of extending arm 444 to connector 450. In the embodiment shown in FIG. 8B, connector 450 may be an electromagnet.

According to the embodiment of FIG. 8B, when robotic cleaner 446 is to be moved from main body 440 to a solar row, connector 450 remains coupled with and attached to robotic cleaner 446 while cable 484 is wound around cylinder 488 for lifting robotic cleaner 446 off of main body 440 by raising the height of one end of extending arm 444. When extending arm 444 has raised robotic cleaner 446 sufficiently to clear the height of a solar row, vertical arm 448 is rotated around its axis, for example by a predetermined angle, thereby moving robotic cleaner 446 over the surface of the solar row. Cylinder 488 may then unwind cable 484 for lowering robotic cleaner 446 onto the surface of the solar row. A lowering of tension in cable 486 (for example using a sensor (not shown) in extending arm 444) may be used as an indication that robotic cleaner 446 has been fully positioned on the solar row. Connector 450 is then disengaged from robotic cleaner 446 (for example, by turning the electromagnet off in the case of connector 450 being embodied as an electromagnet) and a processor (not shown) in autonomous robot 436 may then give a start clean command to robotic cleaner 446 to start cleaning the solar panel surface of the solar row. After robotic cleaner 446 has finished cleaning the surface of the solar row, robotic cleaner 446 returns to its initial position on the solar row and is reattached to connector 450. Extending arm 444 and vertical arm 448 are then used to return robotic cleaner 446 to main body 440, at which point autonomous robot 436 navigates to the next solar row. The initial position of robotic cleaner 446 on the solar row from which it was disengaged from connector 450 may be determined using at least one sensor (not shown) on robotic cleaner 446. The initial position may be determined using a GPS sensor, an inertial sensor and the like on robotic cleaner 446. The initial position may also be determined using a magnetic field sensor on robotic cleaner 446 to sense the magnetic field of connector 450 in the case of connector 450 being embodied as an electromagnet. The initial position may further be determined via a short guiding cable (or antenna) positioned on one end of extending arm 444 which can be sensed by robotic cleaner 446, similar to how autonomous robot 436 senses its proximity to solar row 434. In another embodiment, the initial positon may also be determined by the ability of robotic cleaner 446 to sense a distance from an edge of solar row 434. The navigation algorithm of robotic cleaner 446, as is known in the art, may also enable robotic cleaner 446 to return to its initial start position when it began cleaning.

It will be appreciated by persons skilled in the art that the disclosed technique is not limited to what has been particularly shown and described hereinabove. Rather the scope of the disclosed technique is defined only by the claims, which follow.

The invention claimed is:

1. Robotic cleaner (202) for cleaning at least one solar table of at least one solar row (204), said at least one solar row having a length and a width, said robotic cleaner comprising:
   a trapezoidal shaped body, comprising a top section (208), a bottom section (206) and a middle section (209);
   at least one rechargeable power source;
   electronics, coupled with said at least one rechargeable power source, for operating said robotic cleaner;
   a wireless communicator, coupled with said at least one rechargeable power source and said electronics;
   said top section and said bottom section each respectively comprising a plurality of vertical wheels (210A) and a plurality of horizontal wheels (210B);
   at least one drive motor, for driving at least one of said plurality of vertical wheels and said plurality of horizontal wheels;
   two extensions (214), respectively extending from said top section and said bottom section;
   a lengthwise cylinder (212), coupled between said two extensions;
   a plurality of fins (216), coupled with said lengthwise cylinder; and
   at least one rotation motor, for rotating said lengthwise cylinder, wherein said trapezoidal shaped body has a length substantially equivalent to said length of said at least one solar row;

wherein said top section extends forward from said bottom section in a width direction of said at least one solar row, thereby positioning said lengthwise cylinder at an angle (222) from a length direction of said at least one solar row;

wherein said plurality of vertical wheels enables said robotic cleaner to roll over said at least one solar row;

wherein said plurality of horizontal wheels is positioned under a bottom surface (246B) of said at least one solar row, thereby ensuring that said robotic cleaner remains coupled with said at least one solar row;

wherein said two extensions enable said lengthwise cylinder to rotate freely;

wherein said plurality of fins rotates when said lengthwise cylinder is rotated; and wherein said plurality of fins pushes soiling on a surface of said at least one solar row in both a forward direction and a downwards direction towards said bottom section over said surface of said at least one solar row.

2. The robotic cleaner according to claim 1, wherein said middle section is hollow.

3. The robotic cleaner according to claim 1, wherein said electronics is housed in at least one of said top section and said bottom section.

4. The robotic cleaner according to claim 1, wherein said wireless communicator comprises a wireless transmitter and a wireless receiver.

5. The robotic cleaner according to claim 1, wherein said top section comprises three vertical wheels and three horizontal wheels and wherein said bottom section comprises two vertical wheels and two horizontal wheels.

6. The robotic cleaner according to claim 1, wherein said at least one drive motor is positioned in at least one of said bottom section and said top section.

7. The robotic cleaner according to claim 1, wherein said at least one rotation motor is positioned in at least one of:
a first one of said two extensions;
a second one of said two extensions;
said two extensions;
said bottom section; and
said top section.

8. The robotic cleaner according to claim 1, wherein said plurality of fins is selected from the list consisting of:
microfiber fins; and
cloth fins.

9. The robotic cleaner according to claim 1, further comprising at least one actuator, coupled with said lengthwise cylinder, for adjusting a height of said lengthwise cylinder and thereby adjusting a pressure of said plurality of fins on said at least one solar row.

10. The robotic cleaner according to claim 9, wherein said at least one actuator is positioned in at least one of said two extensions.

* * * * *